March 30, 1926.  1,578,692

O. A. THRASHER

SANITARY NEST LINING

Filed August 5, 1925

Orville A. Thrasher, deceased.
Inventor.
By C. A. Snow & Co.
Attorneys

Patented Mar. 30, 1926.

1,578,692

UNITED STATES PATENT OFFICE.

ORVILLE A. THRASHER, DECEASED, LATE OF AMERICAN FORK, UTAH; BY MARK H. GREENE, ADMINISTRATOR, OF SALT LAKE CITY, UTAH.

SANITARY NEST LINING.

Application filed August 5, 1925. Serial No. 48,358.

*To all whom it may concern:*

Be it known that ORVILLE A. THRASHER, deceased, formerly a citizen of the United States, residing at American Fork, in the county of Utah and State of Utah, did invent a new and useful Sanitary Nest Lining, of which the following is a specification.

This invention relates to poultry equipment and more particularly to sanitary nest linings.

The object of the invention is to provide a nest lining constructed to fit the nest and so support the eggs deposited therein that the collection of dust on the moist egg will be prevented insuring the egg leaving the nest absolutely clean.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1:
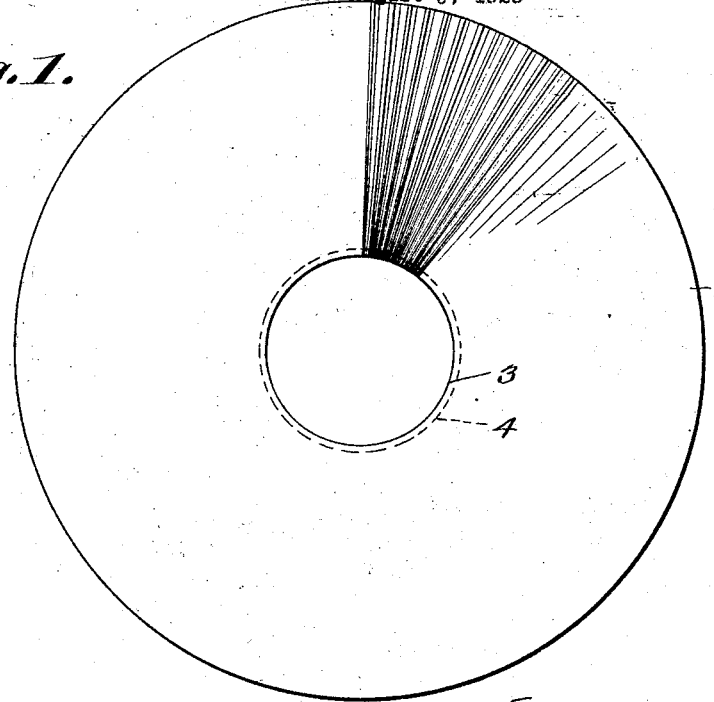
Figure 1 represents a plan view of a lining constructed in accordance with this invention.
Figure 2:
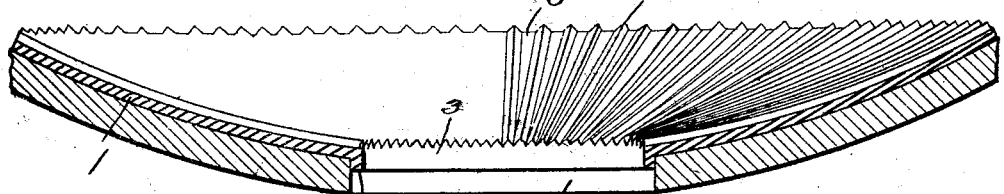
Fig. 2 is a transverse section thereof.
Figure 3:
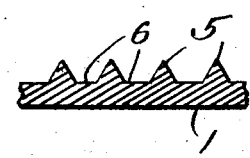
Fig. 3 is a detail section taken across the ribs or corrugations.

In the embodiment illustrated in Figs. 1 to 3 a disk-shaped pad 1 is shown composed of soft rubber or other suitable material designed to be placed in a nest having an opening 2 at the center thereof said nest being here shown shaped similarly to the lining. This lining 1 has a central opening 3 with an outturned flange 4 to fit around the edge of the opening 2 of the nest to prevent breakage of the egg in its passage through these openings. The pad or lining 1 has a plurality of radially extending ribs 5 which are spaced laterally apart to form dust receiving troughs 6 between them. These ribs 5 are triangular in cross section as shown in Fig. 3. This construction of pad provides for the supporting of the egg on the ribs to hold it out of contact with any dust which will settle into the troughs 6 between the ribs. It is of course well known that eggs when first laid are moist and if they are not protected any dust or other foreign particles contacting with the egg will adhere thereto.

Figure 4:
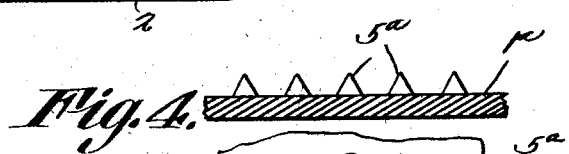
Fig. 4 is a detail sectional view of another form.
Figure 5:
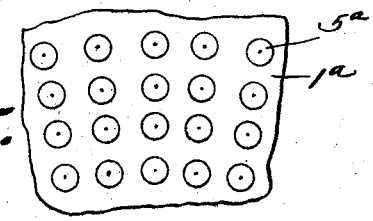
Fig. 5 is a detail plan view of the plan shown in Fig. 4.

In Figs. 4 and 5 the lining 1ª is similar in construction to that shown in the other figures except that the egg supports are made in the form of cone-shaped projections 5ª which are arranged close enough together to support the egg and prevent its contacting with the body of the pad.

This pad 1 may be easily removed and washed and will withstand conditions to which a nest is naturally subjected without being injured.

I claim:—

1. A dish-shaped nest lining having an opening therein with a flange surrounding it and extending outwardly, and a plurality of ribs radiating from said opening to form egg supports.

2. A nest lining comprising a dish-like body portion formed of rubber material, said body portion having a central opening, enlargements formed on the body portion providing dust-receiving spaces therebetween.

3. A nest lining comprising a dish-like body portion formed of rubber material, said body portion having upstanding integral enlargements formed thereon and defining dust spaces therebetween.

MARK H. GREENE,
*Administrator of the Estate of Orville A. Thrasher, Deceased.*